(12) United States Patent
Honda

(10) Patent No.: US 7,412,309 B2
(45) Date of Patent: Aug. 12, 2008

(54) ELECTRIC VEHICLE

(75) Inventor: Satoshi Honda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 601 days.

(21) Appl. No.: 11/030,151

(22) Filed: Jan. 7, 2005

(65) Prior Publication Data

US 2005/0154508 A1   Jul. 14, 2005

(30) Foreign Application Priority Data

Jan. 9, 2004   (JP)   ............................ 2004-003770

(51) Int. Cl.
  *B60L 3/00*   (2006.01)
  *B60L 11/18*   (2006.01)

(52) U.S. Cl. ............................ 701/22; 701/29; 340/438

(58) Field of Classification Search ........................ None
  See application file for complete search history.

(56) References Cited

U.S. PATENT DOCUMENTS

| | | | | |
|---|---|---|---|---|
| 5,352,982 A | * | 10/1994 | Nakazawa et al. | 324/427 |
| 5,534,759 A | * | 7/1996 | Evans et al. | 318/139 |
| 5,539,399 A | * | 7/1996 | Takahira et al. | 340/995.27 |
| 5,594,411 A | * | 1/1997 | Ono | 340/425.5 |
| 5,686,895 A | * | 11/1997 | Nakai et al. | 340/636.1 |
| 6,232,729 B1 | * | 5/2001 | Inoue | 318/139 |
| 6,324,464 B1 | * | 11/2001 | Lee et al. | 701/93 |
| 6,407,663 B1 | * | 6/2002 | Huggett | 340/461 |
| 2002/0116100 A1 | * | 8/2002 | Shimazaki et al. | 701/22 |
| 2005/0080518 A1 | * | 4/2005 | Wakefield, II | 701/1 |

FOREIGN PATENT DOCUMENTS

JP   2003-123848 A   4/2003

* cited by examiner

*Primary Examiner*—Michael J. Zanelli
(74) *Attorney, Agent, or Firm*—Birch, Stewart, Kolasch & Birch, LLP

(57) ABSTRACT

A dynamo-electric motor applies motive power to a drive wheel. A battery supplies electric power to the dynamo-electric motor with a driver for controlling the driving of the dynamo-electric motor. A battery control unit performs a control of charging and discharging of the battery. A speed meter displays predetermined information relating to a vehicle. In the electric vehicle including the elements described above, the battery control unit obtains the vehicle speed, the total travel distance, and the trip travel distance based on a vehicle speed pulse of the dynamo-electric motor detected by the driver, and displays information relating to the vehicle speed, the total travel distance, the trip travel distance and information relating to charging and discharging of the battery on a display unit using communication means.

24 Claims, 10 Drawing Sheets

ELECTRIC VEHICLE

CROSS-REFERENCE TO RELATED APPLICATIONS

The present application is related to Japanese Patent Application No. 2004-003770 filed on Jan. 9, 2004 the entire contents of which are hereby incorporated by reference.

BACKGROUND OF THE INVENTION

1. Field of the Invention

The present invention relates to an electric vehicle having a battery mounted thereon.

2. Description of Background Art

A battery is disclosed in JP-A-2003-123848 which includes a memory for storing the history of usage of the battery or the like. Data stored in the memory is read by an external apparatus.

However, with the battery disclosed in JP-A-2003-123848, a specific apparatus is needed for reading information relating to the battery is required. Thus, a problem arises wherein when the battery is applied to a motorcycle or the like having only a small storage space, an additional space for installing the specific apparatus must be provided.

In the motorcycle or the like, although a function for displaying a total travel distance/trip travel distance is provided, a memory for storing data relating to the travel distance is provided in a display unit of a speed meter. In addition, the fact that the memory for storing the history of the usage or the like of the battery which serves the equivalent function is provided separately and independently is a problem to be solved in view of the efficient usage of the space in the motorcycle or the like which has only a small storage space.

SUMMARY AND OBJECTS OF THE INVENTION

In order to solve such problems described above, it is an object of the present invention to provide an electric vehicle in which information relating to a battery can be read without providing a specific apparatus for reading the same, and in which data stored separately in vehicle devices are stored together in a single storage area, whereby efficiency of usage of the space can be improved.

The present invention is directed to an electric vehicle including a dynamo-electric motor for applying motive power to a drive wheel with a battery for supplying electric power to the dynamo-electric motor. A driver is provided for performing drive control of the dynamo-electric motor with a control unit for performing control relating to charging and discharging of the battery. A display unit is provided for displaying predetermined information relating to the vehicle. The control unit obtains a vehicle speed, a total travel distance, a trip travel distance based on a vehicle speed pulse of the dynamo-electric motor, and displays information relating to the vehicle speed, the total travel distance, and the trip travel distance, and information relating to charging and discharging of the battery on the display unit via communication means.

Since the structure is such that the control unit obtains the vehicle speed, the total travel distance, and the trip travel distance based on the vehicle speed pulse received from the driver, the information relating to the vehicle speed, the total travel distance, and the trip travel distance and the information relating to the charging and the discharging of the battery are displayed on the display unit via the communication means. Thus, the following three advantages are achieved.

A first advantage is that an operator can confirm information relating to the history of usage or the like of the battery on the display unit. Thus, a specific external device for confirming the information relating to the history of usage of the battery is not necessary.

A second advantage is that the information relating to the total travel distance and the trip travel distance as well as the information relating to the history of usage of the battery can be stored in a memory of the control unit. Thus, a memory for storing the total travel distance and the trip travel distance is not necessary to be provided in the display unit of the speed meter, whereby the efficiency of usage of the space is improved and the cost is reduced.

A third advantage is that the control unit can control charging and discharging of the battery and the vehicle speed in an integrated fashion. Thus, the design and maintenance of the entire system are advantageously facilitated.

In addition, the present invention provides a control unit calculates a residual travel distance based on the vehicle speed pulse detected by the driver.

In this structure, the control unit obtains the vehicle speed from the vehicle speed pulse detected by the driver, calculates the residual travel distance from the obtained value, information relating to the residual quantity of the battery stored in the memory of the control unit, and the values of voltage and current of the battery read from the battery, and transmits the result to the speed meter for displaying the same on the display unit of the speed meter. Accordingly, the operator can travel while viewing the residual travel distance, which is a value of distance, whereby planning of travel based on the distance is facilitated.

If the driver detects an abnormality, the driver can change a duty ratio of the vehicle speed pulse to a predetermined value and can transmit the same to the control unit. Thus, the control unit determines the abnormality and displays the abnormality on the display unit.

Since the structure is such that a self detection function of the driver changes the duty ratio of the vehicle speed pulse to the predetermined value when it detects a failure or the like of the driver and sends the changed duty ratio to the control unit, it is not necessary to provide an additional circuit to transmit failure information. Thus, the efficiency of usage of the space can be effectively maintained. In addition, the detected information relating to the failure of the driver can be displayed on the display unit of the speed meter via a circuit, whereby the state of failure can rapidly be transmitted to the operator.

With the structure described above, the present invention has following advantages.

The electric vehicle has a control unit that obtains the vehicle speed, the total travel distance, and the trip travel distance based on the vehicle speed pulse received from the driver, the information relating to the vehicle speed, the total travel distance, and the trip travel distance. The information relating to charging and discharging of the battery is displayed on the display unit via the communication means to provide the following three advantages.

The first advantage is that the operator can confirm information relating to the history of usage or the like of the battery on the display unit. Thus, a specific external device for confirming the information relating to the history of usage of the battery is not necessary.

The second advantage is that the information relating to the total travel distance and the trip travel distance as well as the information relating to the history of usage of the battery can be stored in the memory of the control unit. Thus, the memory for storing the total travel distance and the trip travel distance is not necessary to be provided in the display unit of the speed meter, whereby the efficiency of usage of the space is improved and the cost is reduced.

The third advantage is that the control unit can control charging and discharging of the battery and the vehicle speed in an integrated fashion. Thus, the design and maintenance of the entire system are advantageously facilitated.

The electric vehicle has a structure such that the control unit obtains the vehicle speed from the vehicle speed pulse detected by the driver, calculates the residual travel distance from the obtained value, information relating to the residual quantity of the battery stored in the memory of the control unit, and the values of voltage and current of the battery read from the battery, and transmits the result to the speed meter for displaying the same on the display unit of the speed meter. Accordingly, the operator can travel while viewing the residual travel distance, which is the distance value, thereby facilitating the planning of travel based on the distance.

Since the electric vehicle has a structure such that the self detection function of the driver changes the duty ratio of the vehicle speed pulse to the predetermined value when it detects a failure or the like of the driver and sends the changed duty ratio to the control unit, it is not necessary to provide an additional circuit to transmit the failure information. Thus, the efficiency of usage of the space can be effectively maintained. In addition, the detected information relating to the failure of the driver can be displayed on the display unit of the speed meter via the circuit, whereby the state of the failure can rapidly be transmitted to the operator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
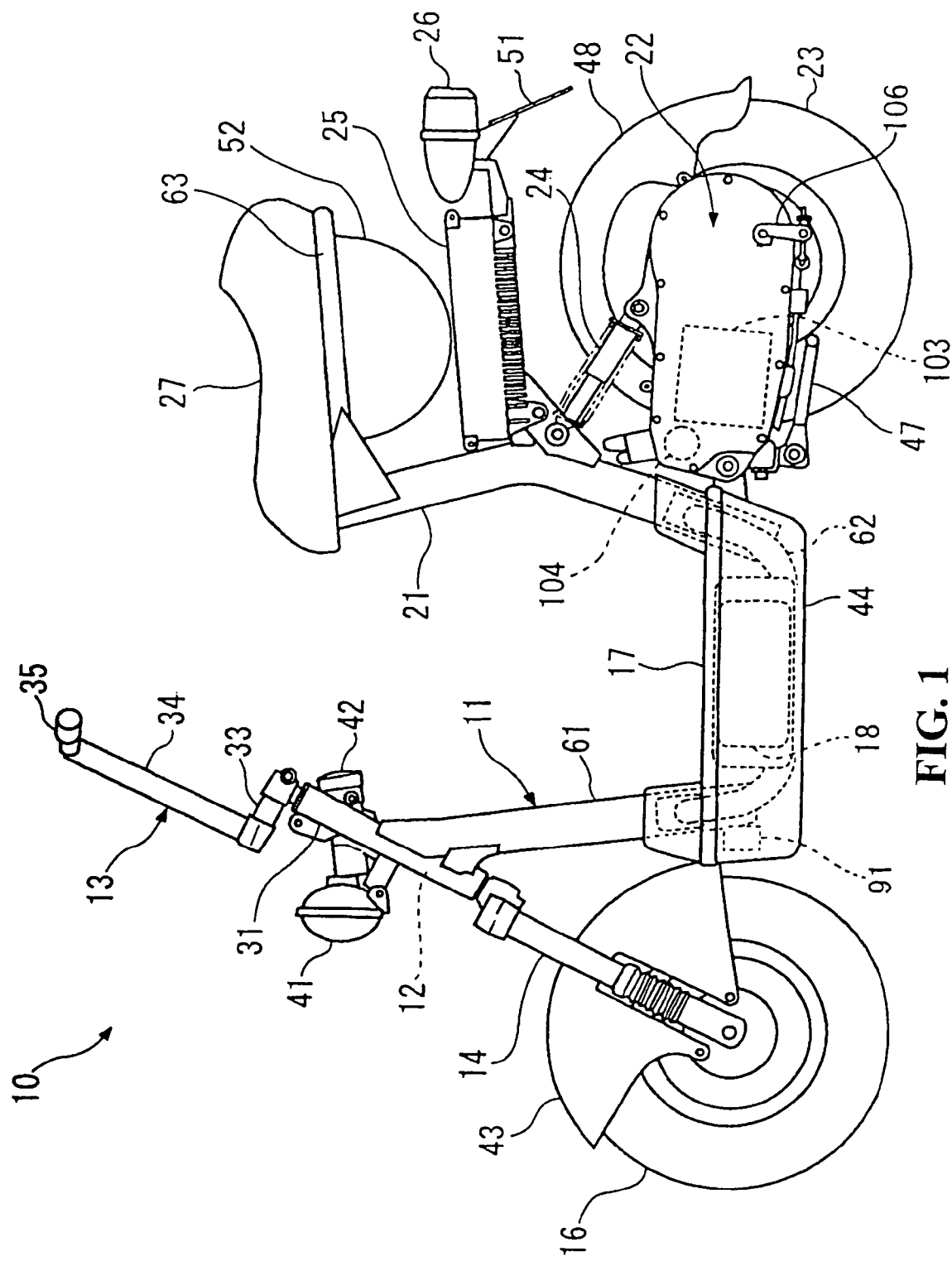
FIG. 1 is a side view of an electrical vehicle according to an embodiment of the present invention.

Hereinafter, referring to the drawings, an electric vehicle according to an embodiment of the present invention will be described. FIG. 1 is a side view of the electric vehicle according to the embodiment of the present invention. An electric vehicle 10 includes a handle shaft 12 rotatably attached to the front portion of a vehicle body frame 11, a handle 13 attached to the top of the handle shaft 12, a front fork 14 attached to the bottom of the handle shaft 12 with a front wheel 16 attached to the lower end of the front fork 14. A floor step 17 is attached to the center portion of the vehicle body frame 11 with batteries 18, 18 disposed below the floor step 17, only the reference numeral on the near side is shown. A swing-type power unit 22 is attached to the lower portion of a seat post 21 constituting the rear portion of the vehicle body frame 11 so as to be capable of vertical swinging motion. A rear wheel 23 is attached to the rear portion of the power unit 22 with a rear shock absorber 24 extending between the upper portion of the power unit 22 and the seat post 21. A battery control unit 25 for voltage converting is provided at the midsection of the seat post 21. A tail lamp 26 is disposed rearwardly of the battery control unit 25 with a seat 27 provided at the upper end of the seat post 21.

The vehicle body frame 11 is provided on the front portion thereof with a head pipe 31 for rotatably supporting the handle shaft 12.

The handle 13 includes an arm 33 attached at the upper end of the handle shaft 12 with a handle supporting member 34 extending upwardly from the arm 33. A handle bar 35 is attached to the upper end of the handle supporting member 34. With the provision of the handle supporting member 34, the head pipe 31 can be arranged at a lower level and the vehicle body frame 11 can be downsized, whereby the weight of the vehicle body frame 11 can be reduced.

The battery 18 is formed by enwrapping a plurality of column-shaped battery cells with a shrink pack, packaging material for enwrapping which is shrunk by heat.

The battery control unit 25 includes a charger for rectifying and lowering a commercial power source to a prescribed voltage and allowing the current to flow into the battery 18, and a DC-DC converter for converting a battery voltage from a high voltage for driving the dynamo-electric motor to a low voltage for supplying electricity to the electric components such as the tail lamp.

In other words, the battery control unit 25 includes the charger and the DC-DC converter integrated as a single unit. In the embodiment described hereinafter, the battery control unit 25 is described as an integrated unit of the charger and the DC-DC converter. However, the charger and the DC-DC converter can also be provided separately as a matter of course. For example, it is also possible to provide the charger in the vicinity of the battery 18, and the DC-DC converter in the vicinity of the electric components such as the tail lamp.

A head lamp 41 and a main switch 42 are attached at the front portion of the vehicle body frame 11 with a front fender 43 that covers the upper portion of the front wheel 16. An under cover 44 is provided for covering the lower portion of the floor step 17 with a side stand 41 being mounted adjacent thereto. A rear fender 48 covers the top of the rear wheel 23 with a license plate 51 being attached to the lower portion of the tail lamp 26. A helmet 52 is stored below the seat 27.

Figure 2:
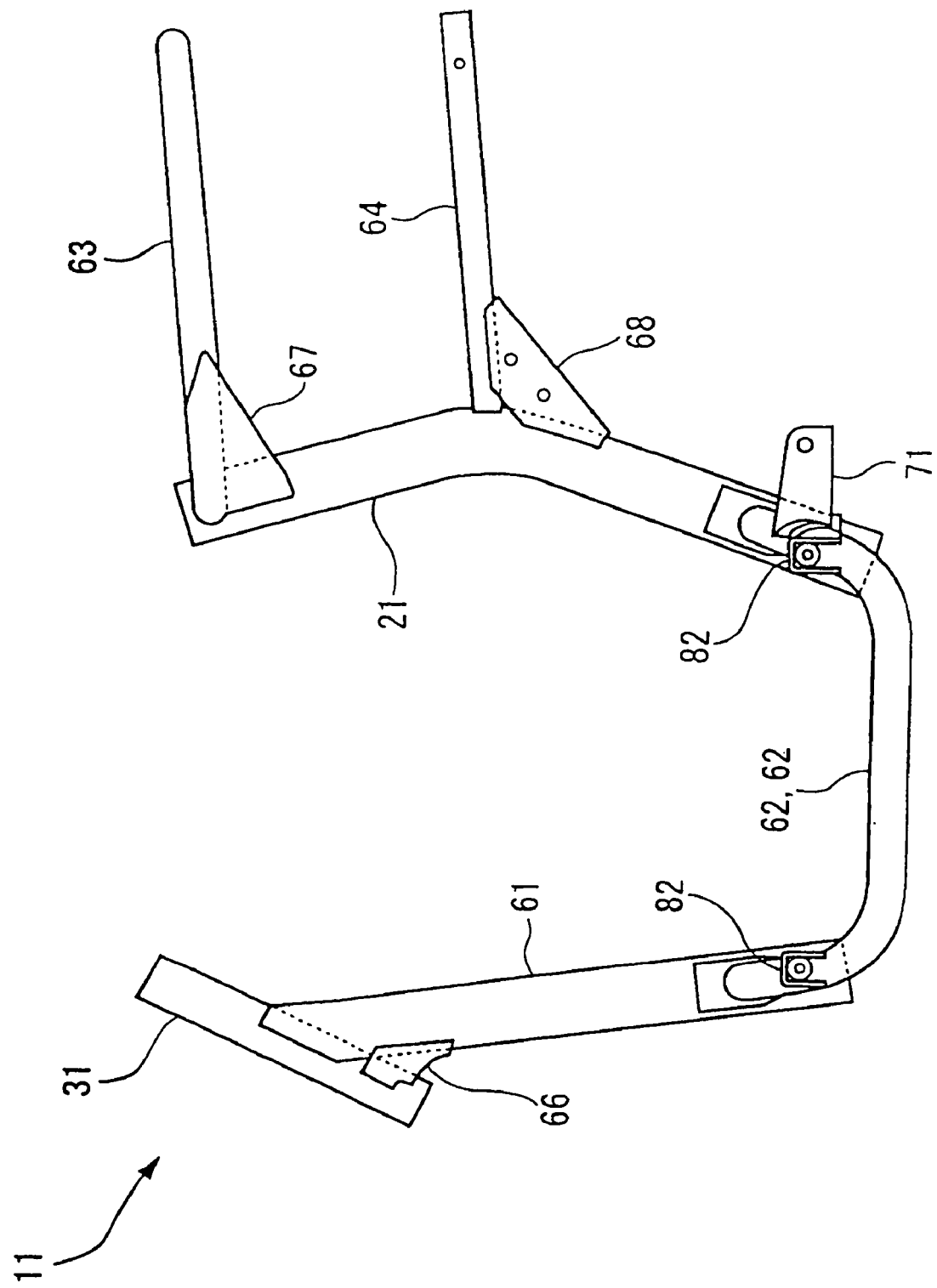
FIG. 2 is a side view showing a vehicle body frame of the electric vehicle according to the same embodiment.

FIG. 2 shows a side view showing the vehicle body frame of the electric vehicle according to the present embodiment. The vehicle body frame 11 includes the head pipe 31, a down pipe 61 extending substantially straight downwardly from the head pipe 31, a pair of left and right lower pipes 62, 62 extending downwardly from the down pipe 61, then rearwardly, and then upwardly. The seat post 21 is formed into an angular C-shape attached to the lower pipes 62, 62 with a seat frame 63 extending rearwardly from the upper end of the seat post 21. An intermediate frame 64 extends rearwardly from the midsection of the seat post 21. Reinforcing members 66, 66, 67, 67, 68, 68 (only the reference numerals 66, 67, 68 on the near side are shown) are provided together with a power unit supporting member 71 attached to the lower end of the seat post 21 for attaching a swing shaft of the power unit 22. See FIG. 1.

By arranging the head pipe 31, the down pipe 61, the lower pipes 62, 62, and the seat post 21 of the vehicle body frame 11 to form a substantially U-shape, the vehicle body frame 11 is provided with functions required for the electric vehicle 10 such as to support the handle 13 and the seat 27 by the ends of the U-shape, and supporting the floor step 17 and storing the battery 18 at the bottom of the U-shape in a simple structure as shown in FIG. 1.

Figure 3:
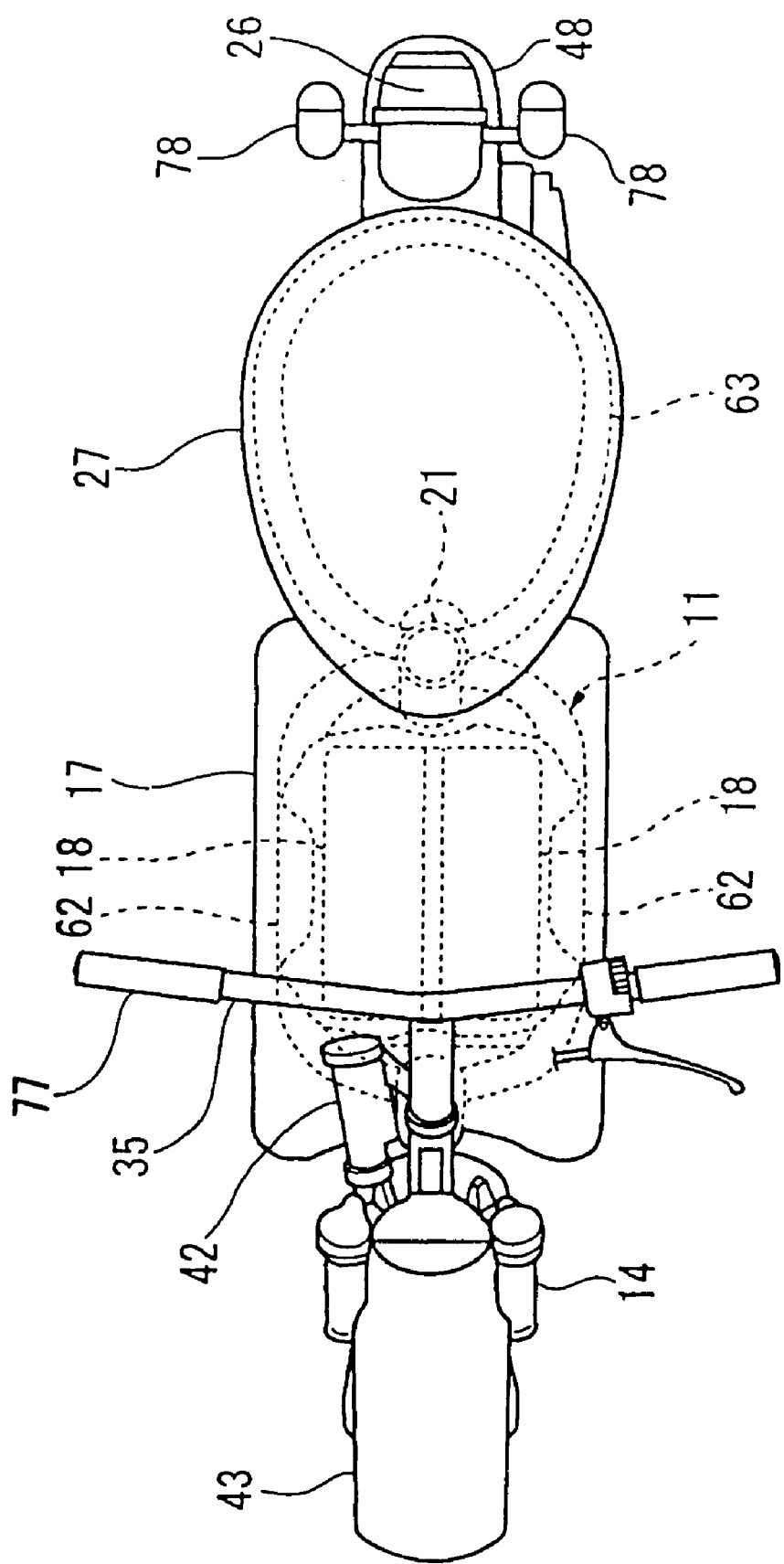
FIG. 3 is a plan view of the electric vehicle according to the same embodiment.

FIG. 3 is a plan view of the electric vehicle according to the present embodiment, showing a state in which the lower pipes 62, 62 of the vehicle body frame 11 are disposed below the substantially square floor step 17, and the batteries 18, 18 are arranged side by side between the lower pipes 62, 62. A grip 77 is provided for adjusting the output of the dynamo-electric motor (described later) with winkers 78, 78 attached to the left and right sides of the tail lamp 26. The grip 77 may be a type which is normally used in an electric two-wheeled vehicle and is operated by being gripped and rotated, or a lever-type (thumb-throttle) which is used for an ATV (All Terrain Vehicle) or the like.

Figure 4:
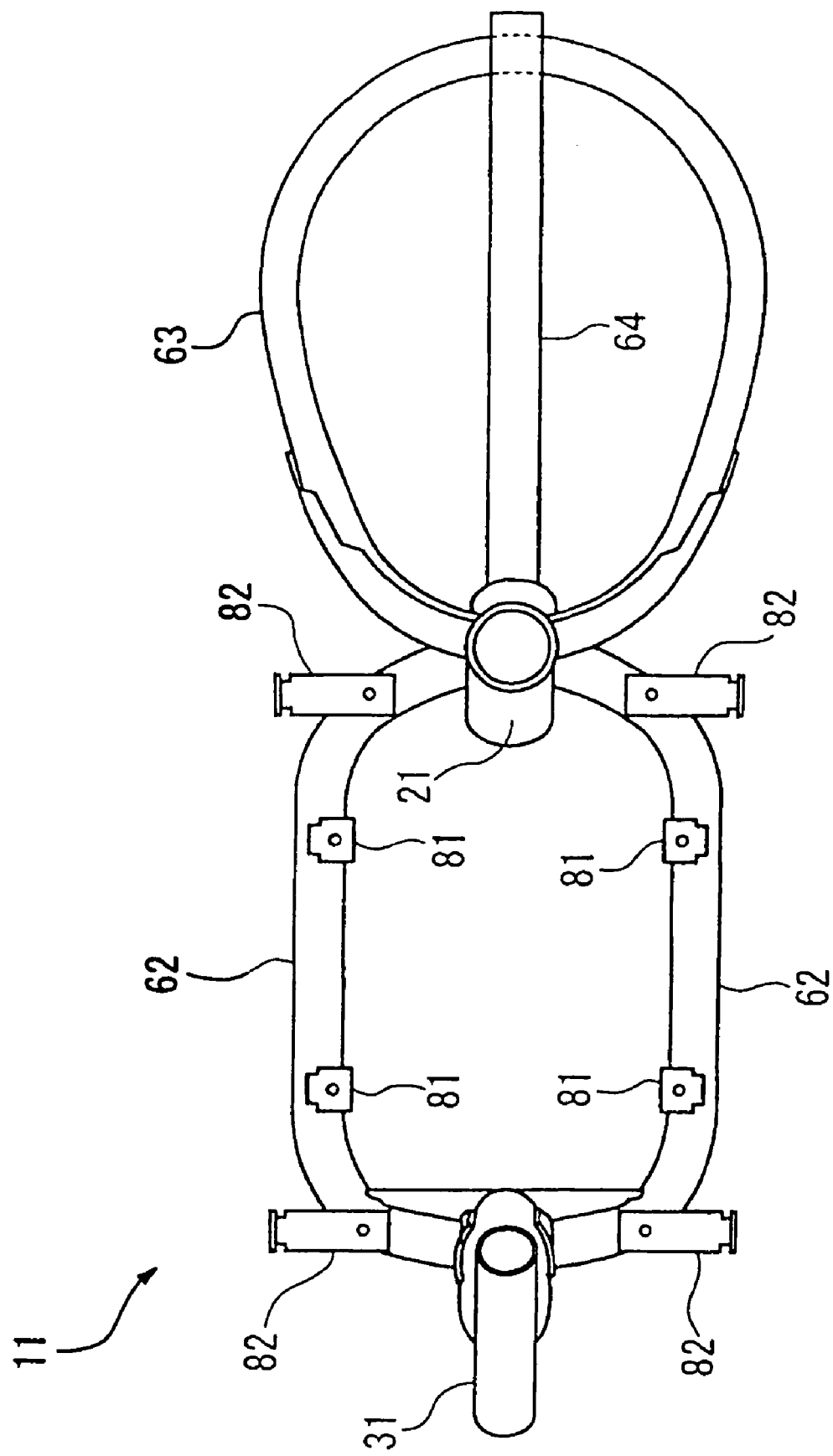
FIG. 4 is a plan view showing the vehicle body frame according to the same embodiment.

FIG. 4 is a plan view showing the vehicle body frame of the electric vehicle according to the present embodiment, showing that the seat frame 63 of the vehicle body frame 11 is formed into circular shape, oval shape or a shape close thereto. Thus, the edge of the helmet 52 (See FIG. 1) can be hooked inside the seat frame 63, so that the helmet 52 can be retained by the seat frame 63. First brackets 81 . . . ( . . . represents that there exist a plurality of elements, hereinafter) are attached to the lower pipes 62, 62 for fixing the floor step 17, see FIG. 3, to the lower pipes 62, 62. Second brackets 82 . . . are attached to the lower pipes 62, 62 for fixing the floor step 17 and the under cover 44 (See FIG. 1) to the lower pipes 62, 62.

Figure 5:
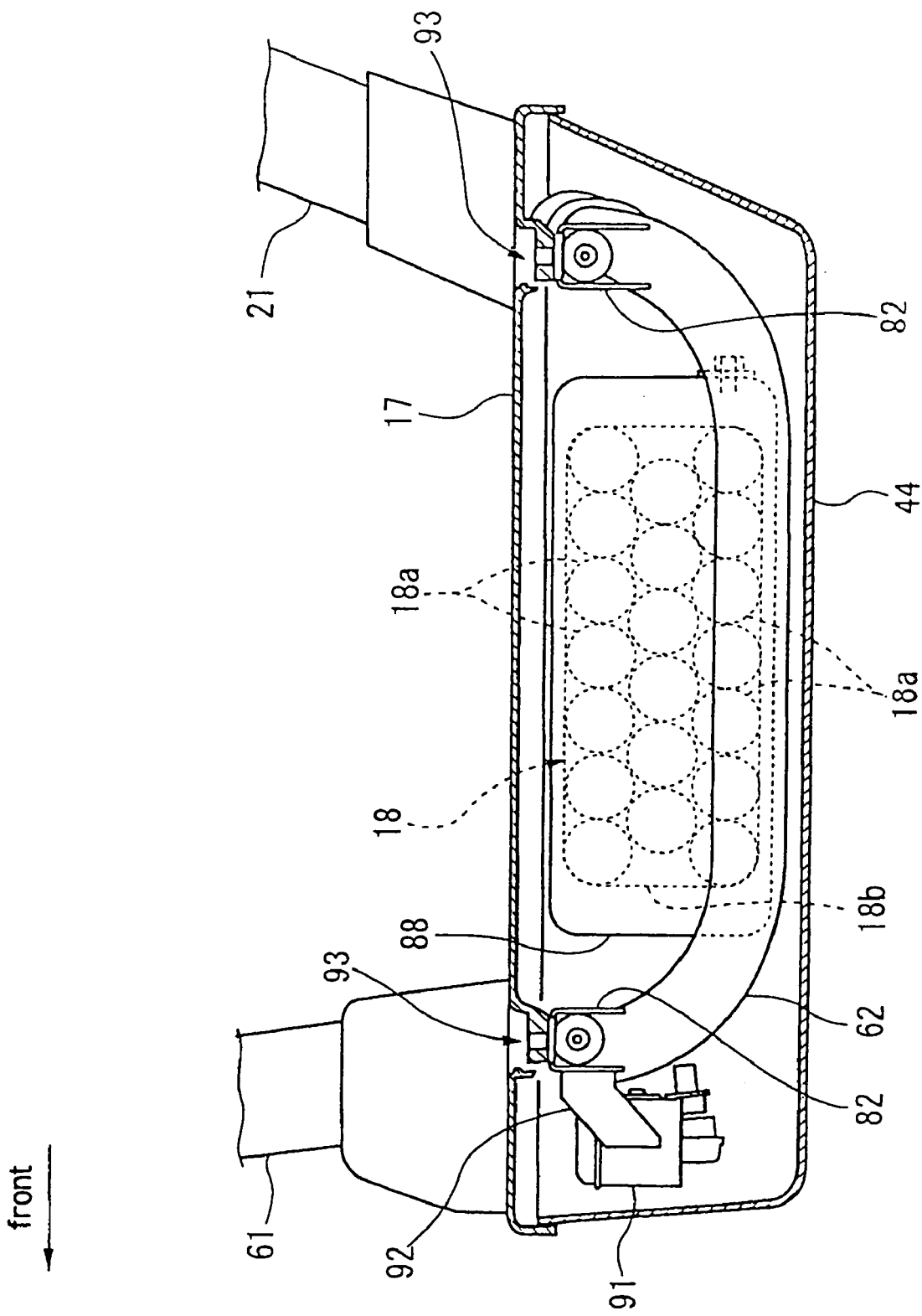
FIG. 5 is a cross-sectional view showing a battery mounted on the electric vehicle according to the same embodiment.

FIG. 5 is a cross-sectional view showing the battery mounted on the electric vehicle according to the present embodiment with an arrow in the drawing marked "front" representing the front of the vehicle, hereinafter.

The battery 18 is formed by stacking a plurality of column-shaped nickel metal-hydride battery cells 18a . . . and enwrapping the cells with the aforementioned shrink pack 18b. The battery 18 is disposed below the floor step 17 in a state of being stored in a battery case 88. A winker relay is attached to one of the lower pipes 62 via a bracket 92 with mounting members 93 . . . provided on the floor step 17 for mounting the floor step 17 to the second brackets 82 . . . .

Figure 6:
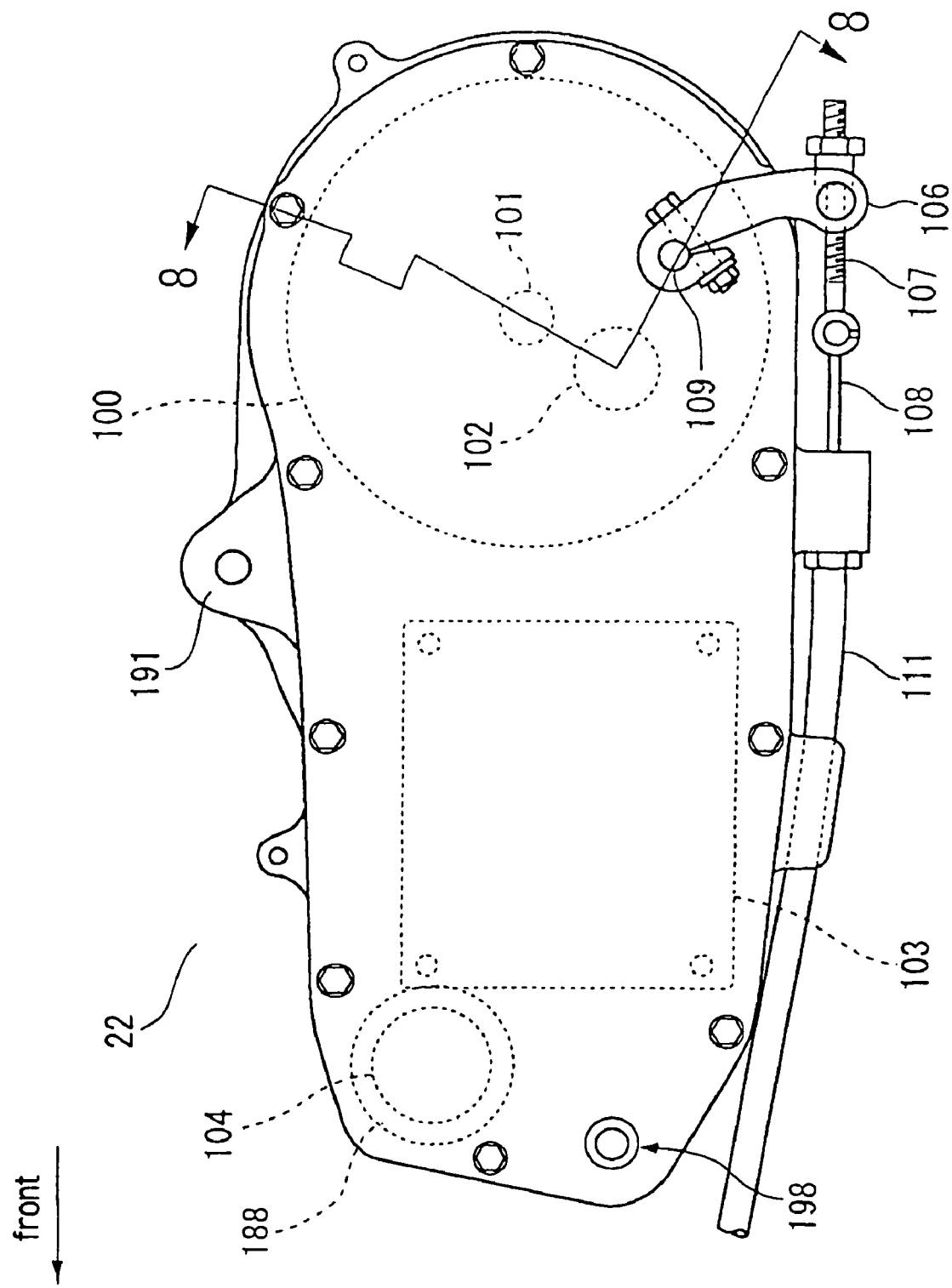
FIG. 6 is a side view of a power unit according to the same embodiment.

FIG. 6 is a first side view of the power unit according to the present embodiment, viewed from the side of the power unit 22 opposite from the rear wheel 23. See FIG. 1.

The power unit 22 includes a dynamo-electric motor 100 stored in the rear half thereof with the dynamo-electric motor 100 being connected to an axle 102 of the rear wheel 23 via an output shaft 101 thereof. See FIG. 1. A driver 103 for controlling power to be supplied to the dynamo-electric motor 100, more specifically, for controlling the driving of the dynamo-electric motor 100 and a smoothing capacitor 104 attached to the driver 103 are mounted in the front half thereof. A capacitor case 188 is provided for storing the smoothing capacitor 104.

The power transmitting system of the power unit 22 is of a reduction type which transmits output power from the dynamo-electric motor 100 to the rear wheel 23 via a speed reducing mechanism (described later). The driver 103 is composed of a switching member such as a power FET (Field Effect Transistor).

A brake arm 106 is provided for a drum brake for braking the rear wheel 23 with an adjusting member 107 being attached to the extremity of the brake arm 106. A wire 108 is connected to the adjusting member 107 as well as to a brake lever (not shown) with an outer cable 111 being provided for storing the wire 108 so as to be capable of moving freely therein. When the brake lever is squeezed, the brake arm 106 is swung via the wire 108 and the adjusting member 107 with a cam member being provided at the extremity of a brake shaft 109 serving as a rotating shaft of the brake arm 106 that is rotated. A brake shoe (described later in detail) is pushed against a brake drum (described later in detail) via the cam member, and the rear wheel 23 is braked. The adjusting member 107 is a member for adjusting the initial angle of the brake arm 106. A cushion-lower-end mounting member 191 is provided for mounting the lower end of the rear shock absorber 24. See FIG. 1. A frame mounting member 198 is mounted to the power unit supporting member 71, see FIG. 2, on the side of the vehicle body frame 11, see FIG. 2, via the swing shaft.

In the present embodiment, the output shaft 101 of the dynamo-electric motor 100 is offset and disposed obliquely upwardly and rearwardly of the axle 102. By disposing the output shaft 101 and the axle 102 in this manner, the length of the vehicle body in the fore-and-aft direction may be shortened, and hence downsizing of the vehicle body is achieved. The output shaft 101 may be disposed obliquely upwardly and forwardly of the axle 102.

Figure 7:
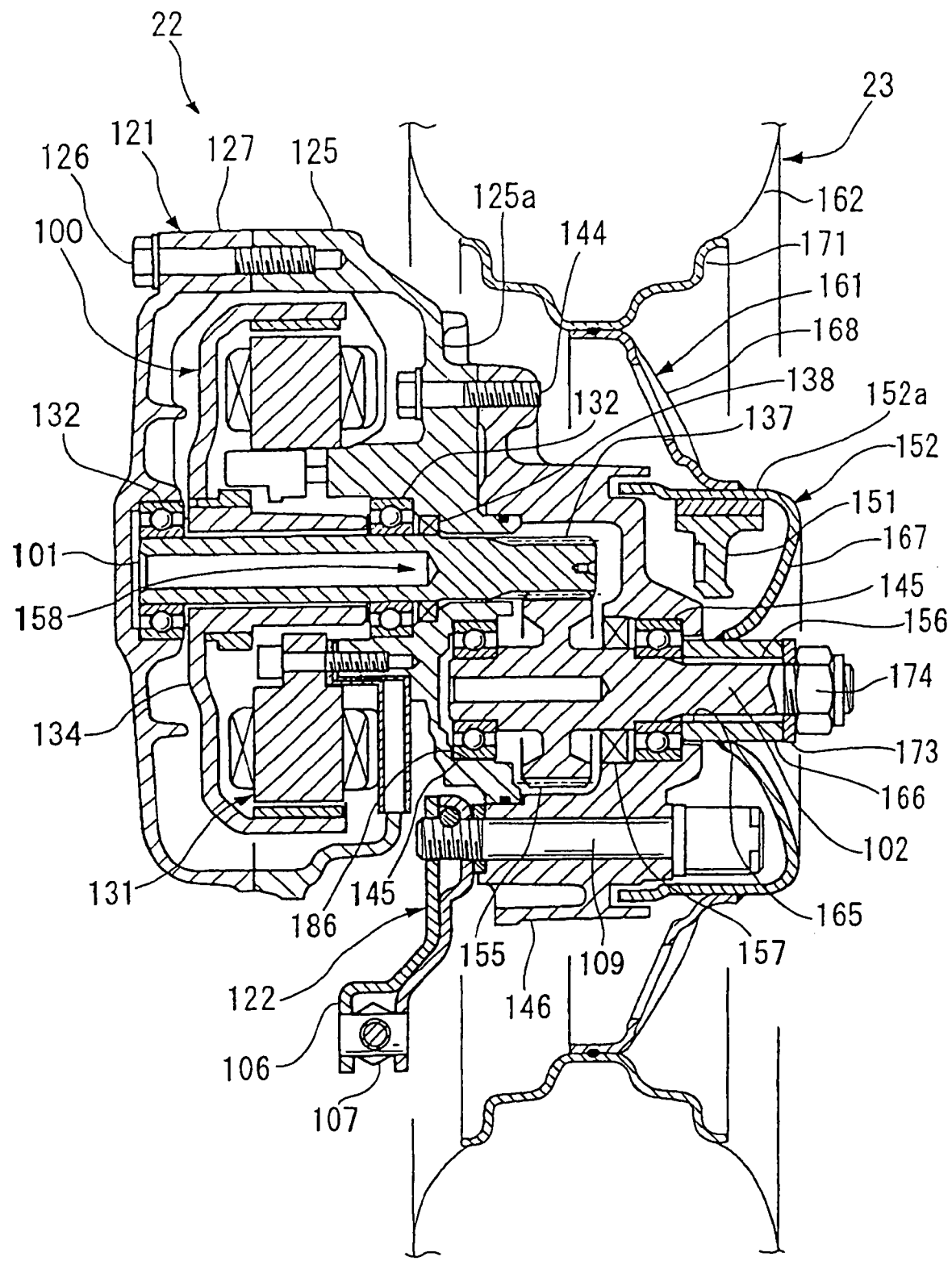
FIG. 7 is a cross-sectional view taken along the line 8-8 in FIG. 6.

FIG. 7 is a cross-sectional view taken along the line 8-8 in FIG. 6. The power unit 22 includes a unit case 121 for storing the dynamo-electric motor 100 with a drum brake device 122 attached to the side surface of the unit case 121, and the axle 102 being mounted to the drum brake device 122.

The unit case 121 is a member divided into two portions including a case body 125 on the side of the rear wheel 23 and a case cover 127 attached to the opening side of the case body 125 via bolts 126 . . . , only one bolt is shown in the drawing.

The dynamo-electric motor 100 is of an outer rotor system including a stator 131 attached to the case body 125 with output shaft 101 rotatably attached to the unit case 121 via bearings 132, 132, and a rotor 134 attached to the output shaft 101 via a spline fitting. Teeth 137 are provided at the extremity of the output shaft 101 with a dust seal 138 being mounted thereon.

The drum brake device 122 is a device mounted to an inner surface 125a of the case body 125 via bolts 144 . . . , that includes a base member 146 for rotatably supporting the axle 102 via bearings 145, 145 together with the case body 125. The brake shaft 109 is rotatably attached to the base member 146 and is provided at one end with the brake arm 106. A cam member, not shown, is mounted at the other end of the brake shaft 109 with a brake shoe 151 opened radially outwardly when being pressed by the rotation of the cam member. A cup-shaped brake drum 152 that is mounted against the inner surface of the brake shoe 151 is pressed by the brake arm 106.

The axle 102 is formed with teeth 155 which mesh with the teeth 137 of the output shaft 101 and a male spline 156 for connecting the rear wheel 23. A dust seal 157 is provided between the base member 146 and the axle 102 with a hole 186 for allowing the axle 102 to pass through.

The output shaft 101 provided with the teeth 137 and the axle 102 provided with the teeth 155 are members which constitute a speed reducing mechanism 158.

The rear wheel 23 includes a wheel portion 161 attached to the axle 102, and a tire 162 mounted on the outer periphery of the wheel portion 161.

The wheel portion 161 includes the aforementioned brake drum 152 constructed of a boss member 166 forming a female spline 165 fitted to the male spline 156 of the axle 102 and a cup-shaped drum portion 167 with a disk portion 168 mounted on an outer periphery 152a of the brake drum 152, and a rim portion 171 mounted on the outer periphery of the disk portion 168. A washer 173 and a nut 174 are provided for attaching the rear wheel 23 to the axle 102.

The structure of the power unit 22 shown in FIG. 7 will be described further in detail.

The wheel portion 161 is a member in which the center side (that is, the side of the drum portion 167) projects from the center of the rear wheel 23 in the direction of the width of the vehicle to the side opposite from the dynamo-electric motor 100. More specifically, the boss member 166 serves as a center of rotation of the rear wheel 23 in the offset state.

Also, since the speed reducing mechanism 158 is provided between the dynamo-electric motor 100 and the rear wheel 23 and is disposed in the wheel portion 161 offset as described above so as to be sunk therein. Even when the power unit 22 of so-called reduction type is employed, the amount of projection of the power unit 22 sideways of the vehicle body with respect to the rear wheel 23 can be reduced. Therefore, the power unit 22 and the rear wheel 23, which are heavy elements, may be disposed substantially at the center in the direction of the width of the vehicle.

Subsequently, power transmission from the dynamo-electric motor 100 to the rear wheel 23 will be described.

Drive current is supplied to the stator 131 under the control from the driver 103. Control of the drive current is performed, for example, by PWM (Pulse Wide Modulation) control.

Pulse Wide Modulation control is a system for controlling the number of revolutions (and torque) of the dynamo-electric motor 100 by applying voltage to the dynamo-electric motor 100 in a pulsed manner, and changing the ratio of the duration between ON and OFF of the pulse, duty ratio.

By the aforementioned PWM control, the rotor 134 is rotated by the rotating magnetic field generated around the stator 131, and the output shaft 101 is rotated correspondingly. Power from the output shaft 101 is reduced via the teeth 137 and the teeth 155, and is transmitted to the axle 102. In this manner, the power from the dynamo-electric motor 100 is reduced and transmitted to the rear wheel 23.

The speed reducing mechanism with a fixed speed reduction ratio which includes the output shaft 101 and the axle 102 has been shown as an example in the present embodiment. A speed reducing mechanism in which power from the dynamo-electric motor 100 is changed by a separate speed changer and transmitted to the rear wheel 23 is also applicable. As such a speed reducing mechanism, for example, a stepless speed-changer may be employed.

Furthermore, the electric vehicle according to the present embodiment also includes a regenerative charging mechanism. In other words, when the speed of the electric vehicle 10 is reduced by operating the drum brake device, a front brake, or the like, the dynamo-electric motor 100 is drive as a power generator for converting the rotational force transmitted from the rear wheel 23 to the dynamo-electric motor 100 when the speed is reduced into electric energy that is accumulated in the batteries 18, 18.

Figure 8:
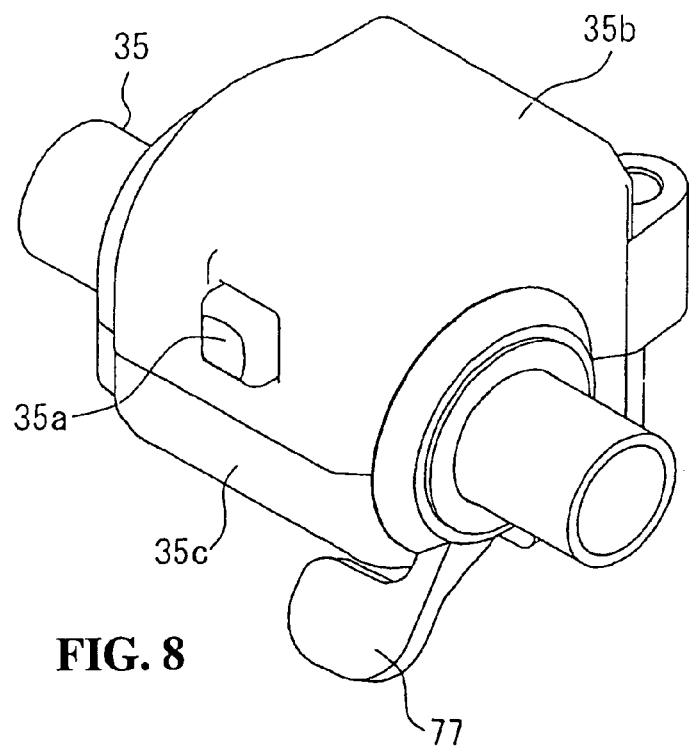
FIG. 8 is a perspective view around a manual movement switch according to the same embodiment.

FIG. 8 is a perspective view of a manual movement switch 35a and the grip 77, provided on the handle bar 35 of the electric vehicle according to the present embodiment. The grip 77 is of the aforementioned lever-type thumb-throttle system. The manual movement switch 35a which is to be pressed when the operator pushes and moves the vehicle manually, is fixed to the handle bar 35 by an upper switch housing 35b and a lower switch housing 35c.

Figure 9:
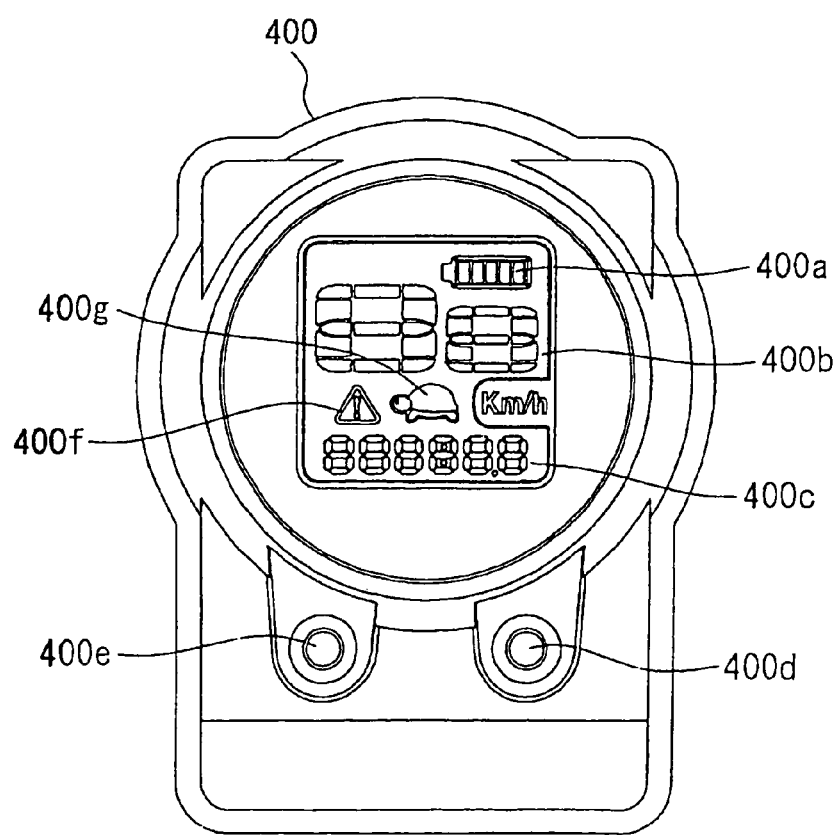
FIG. 9 is a front view of a display unit of a speed meter according to the same embodiment.

FIG. 9 is a plan view of a display unit of a speed meter 400 of the electric vehicle according to the present embodiment. A residual battery display unit 400a shows the residual quantity of battery which notifies the residual quantity to the operator by reducing the number of illuminated blocks as the residual quantity of battery decreases. A speed display unit 400b is provided wherein the speed is displayed in digital form. A distance display unit 400c displays the total travel distance, the trip travel distance and the residual travel distance in a digital form. The operator can switch the display of the total travel distance, the trip travel distance, and the residual travel distance by a switch 400d and a switch 400e. An alarm display unit 400f is turned on when the driver 103 detects excessive heat or excessive current of the dynamo-electric motor 100 and Thereby determining the system to have a failure for notifying the operator. A residual battery alarming display unit 400g is turned on when the residual quantity of battery, as shown in display unit 400a, underruns 20%, and provides an alarm to the operator.

Figure 10:
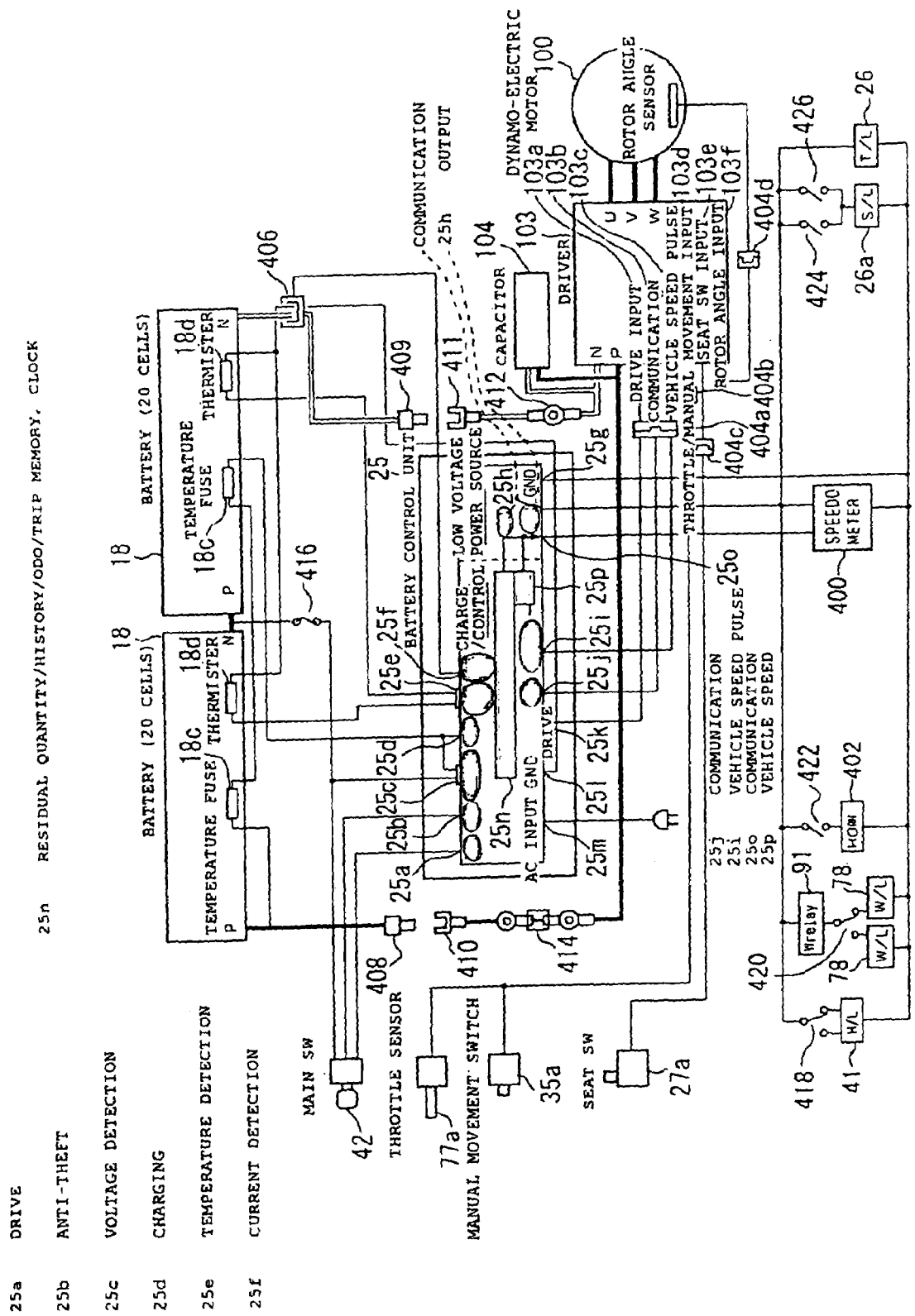
FIG. 10 is an electric wiring diagram of the electric vehicle according to the same embodiment.

FIG. 10 is an electric circuit of the electric vehicle according to the present embodiment. A connection between a port of the battery control unit 25 and other devices will be described below. The main switch 42 is connected to a drive port 25a and an anti-theft port 25b of the battery control unit 25. The main switch 42 is connected to the circuit which connects the negative pole of the left battery 18 and the positive pole of the right battery 18 in FIG. 10 via a fuse 416, and the circuit is bifurcated and connected to a voltage detection port 25c. Temperature fuses 18c, 18c of the battery 18, 18 are connected in series, and one end thereof is connected to a charging port 25d. The circuit is branched and connected also to the voltage detection port 25c.

One end of each thermister 18d, 18d of each battery 18, 18 is connected to a temperature detection port 25e, and the other end thereof is connected to a GND port (ground port) 25l. An ampere meter 406 is mounted so as to bind the circuit connecting the negative pole of the battery 18 and the negative pole of the driver 103 and the circuit connected to the thermister 18d and the GND port 25l, and the ampere meter 406 is connected to a current detection port 25f. The output port 25h is connected to one end of the tail lamp 26, the speed meter 400, and the winker relay 91 of the electric vehicle, and is connected to one end of the head lamp 41 via a switch 418, is connected to one end of a stop lamp 26a via switches 424, 426, and is connected to one end of a horn 402 via a switch 422. The other end of the winker relay 91 is connected to the ends of the winker lamps 78, 78 via a switch 420. The GND port 25g is connected to the other ends of the tail lamp 26, the speed meter 400, the head lamp 41, the stop lamp 26a, the horn 402, and the winker lamps 78, 78.

A vehicle speed pulse port 103c of the driver 103 which drives the dynamo-electric motor 100 is connected to a vehicle speed pulse port 25i via a coupler 404a, and the vehicle speed pulse port 25i is connected to a vehicle speed detector 25p of the battery control unit 25. The vehicle speed pulse information is transmitted from the driver 103 to the vehicle speed detector 25*p*, and the vehicle speed detector 25*p* calculates the vehicle speed from the received vehicle speed pulse. The vehicle speed detector 25*p* is connected to the speed meter 400 via a communication port 25*o*, and the calculated vehicle speed is transmitted to the speed meter 400, and is displayed on the speed meter 400. Transmitting/receiving of information between the battery control unit 25 and the driver 103 is performed by using the circuit between a communication port 25*j* of the battery control unit connected via the coupler 404*a* and a communication port 103*b* of the driver 103. Likewise, a drive input port 103*a* of the driver 103 is connected to a drive port 25*k* via the coupler 404*a*, and instructions, such as initialization in the driver 103, are transmitted from the battery control unit 25 using this circuit. An AC input port 25*m* is a port for connecting to an external AC power source when charging. The battery control unit 25 includes a memory 25*n* in which residual battery information, history information, total travel distance information (Odo in FIG. 10), trip travel distance information (Trip in FIG. 10), and clock information, and the memory 25*n* is connected to the speed meter 400 via the communication port 25*o*, whereby the contents in the memory 25*n* is transmitted to the speed meter 400 via the communication port 25*o*. The speed meter 400 received such information displays corresponding to information on the respective display unit described in conjunction with FIG. 9. The residual battery information is displayed on the residual battery display unit 400*a*, and when it reaches a predetermined level, the residual battery alarming display unit 400*g* is turned on. The total travel distance information and the trip travel distance information are displayed on the distance display unit 400*c*.

A connection between devices other than the battery control unit 25 in FIG. 10 will be described below. A throttle sensor 77*a* mounted to the grip 77 for detecting the throttle opening and the manual movement switch 35*a* mounted to the handle bar 35 for starting manual movement control are connected to a throttle/manual movement input port 103*d* of the driver 103 via a coupler 404*b*. A seat switch 27*a* mounted to the seat 27 for detecting whether or not the operator is seated is connected to a seat switch input port 103*e* of the driver 103 via a coupler 404*c*. A rotor angle input port 103*f* of the driver 103 is connected to the rotor angle sensor of the dynamo-electric motor 100 via a coupler 404*d*, and rotor angle information of the dynamo-electric motor 100 is transmitted to the driver 103, whereby the driver 103 obtains the vehicle speed pulse from the transmitted value. The positive pole of the driver 103 is connected to the positive pole of the left battery and one of the terminals of the smoothing capacitor 104 in FIG. 10 via a fuse 414, a jack 410, and a plug 408. The negative pole of the driver 103 is connected to the negative pole of the right battery 18 and the other terminal of the smoothing capacitor 104 in FIG. 10 via a fuse 412, a jack 411, and a plug 409.

Subsequently, the function of the battery control unit 25 will be described. The battery control unit 25 performs a charging control of the battery from information obtained via the voltage detection port 25*c* and the temperature detection port 25*e*. It also calculates the residual quantity of battery from voltage values of the batteries 18, 18 and a current value obtained via the current detection port 25*f*. The battery control unit 25 is activated by a power source connection of the AC input port 25*m*, turning ON of the main switch 42, and excessive voltage of the battery, and the charging control, activation of driver, and activation of driver in an excessive voltage preventing mode are performed, respectively. Also, the battery control unit 25 has a function to give an instruction of refresh discharge to the driver 103 as needed and cause the batteries 18, 18 to discharge.

Subsequently, the process of revising the content of the memory 25*n* and of displaying the same on the speed meter 400 when the dynamo-electric motor is activated will be described using FIG. 10.

First, when the main switch 42 is pressed, the battery control unit 25 is activated via the drive port 25*a* of the battery control unit 25, and the voltage of the batteries 18, 18, the charging state, the temperature state, and a current are detected via the voltage detection port 25*c*, the charging port 25*d*, the temperature detection port 25*e*, the current detection port 25*f* of the battery control unit 25. The battery control unit 25 reads information stored in the memory 25*n*, and revises the residual quantity information according to the state detected from the batteries 18, 18. Then, the residual battery information, the history information, the total travel distance information, the trip travel distance information, and the clock information stored in the memory 25*n* are transmitted to the speed meter 400 via the communication port 25*o*, and the speed meter 400, having received the above described information, displays corresponding information on the respective display units described in conjunction with FIG. 9. The residual battery information is displayed on the residual battery display unit 400*a*, and when it reaches a predetermined level, the residual battery alarming display 400*g* is turned on. The total travel distance information and the trip travel distance information are displayed on the distance display unit 400*c*.

Subsequently, the driver 103 is driven by electric power supplied from the batteries 18, 18, and the drive signal is transmitted from the drive port 25*k* of the battery control unit 25 to the drive input port 103*a* of the driver 103, whereby the driver 103 is initialized. The driver 103 detects the throttle opening of the throttle sensor 77*a* from the throttle/manual movement input port 103*d* and drives the dynamo-electric motor 100 according to the angle of the throttle opening. The dynamo-electric motor 100 drives the rear wheel 23 via the speed reducing mechanism 158. See FIG. 7. After having started the dynamo-electric motor 100, the driver 103 detects the rotor angle from the rotor angle sensor of the dynamo-electric motor 100 via the rotor angle input port 103*f*, and detects the vehicle speed pulse based on the detected information. The detected vehicle speed pulse is transmitted from the vehicle speed pulse port 103*c* of the driver 103 to the vehicle speed pulse port 25*i* of the battery control unit 25, and is transmitted further to the vehicle speed detector 25*p*. The vehicle speed detector 25*p* which received the vehicle speed pulse converts the vehicle speed pulse into the vehicle speed, and transmits the same to the speed meter 400 via the communication port 25*o*, and the vehicle speed is displayed on the speed display unit 400*b* of the speed meter 400. Also, the total travel distance and the trip travel distance are revised from the vehicle speed information, and likewise the revised information is transmitted to the speed meter 400. Accordingly, the storage device is not necessary in the speed meter 400, the residual battery information, the history information, the total travel distance information, the trip travel distance information, and the clock information are transmitted from the battery control unit 25 via the communication port 25*o*, whereby it can be displayed on the distance display unit 400*c* of the speed meter 400.

The battery control unit 25 calculates the residual travel distance from information relating to the residual quantity of battery, the battery voltage which can be obtained from the battery 18, and the battery current stored in the memory 25*n* in addition to the vehicle speed, transmits the same to the speed meter 400 via the communication port 25*o*, and the information is displayed on the distance display unit 400*c* of the speed meter 400.

Figure 11A:
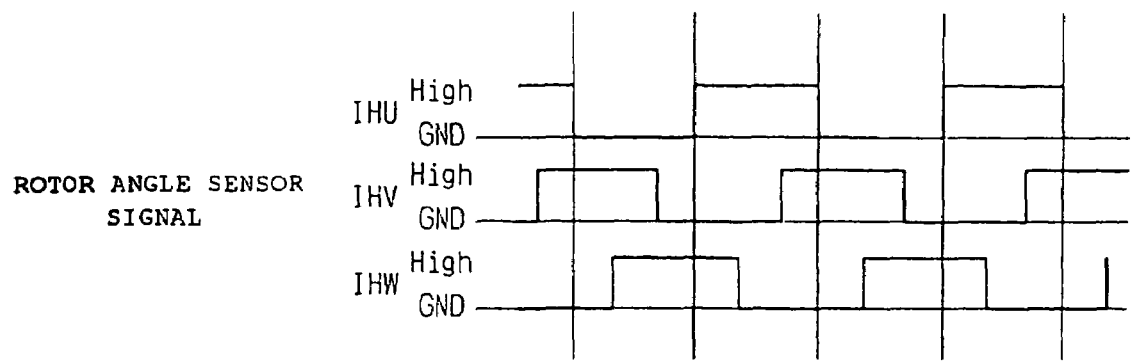
FIGS. 11(a) and 11(b) are timing charts of a rotor angle sensor signal and a vehicle speed pulse signal according to the same embodiment.
Figure 11B:
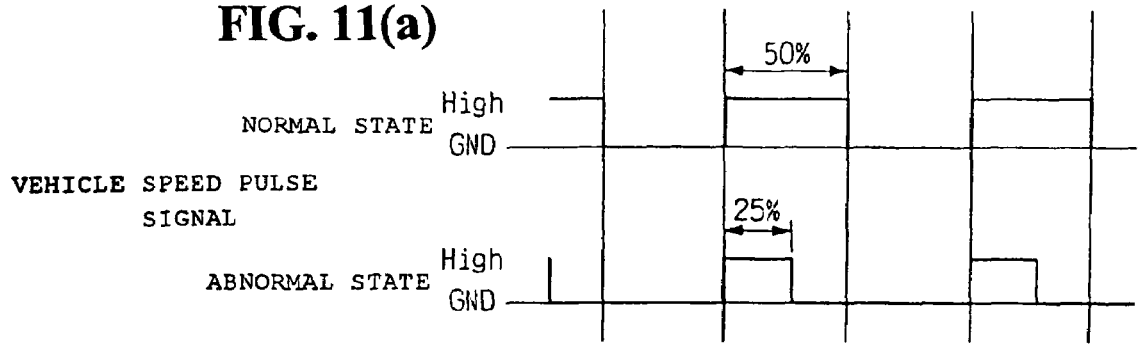

Subsequently, referring now to FIG. 11, a function to notify of an abnormality to the speed meter 400 when the driver 103 detects the abnormality via the self detecting function will be described. In the normal traveling state, the driver 103 receives the rotor angle sensor signal from the rotor angle sensor of the dynamo-electric motor 100 via the coupler 404*d* through the rotor angle input port 103*f*, and calculates the vehicle speed pulse signal from the received signal. FIG. 11(*a*) shows a change in the current value of three-phase current of the rotor angle sensor signal, and the vehicle speed pulse signal as shown in a graph of the normal state in FIG. 11(*b*) is determined. The driver 103 transmits the vehicle speed pulse signal to the battery control unit 25 via the vehicle speed pulse port 103*c*. The battery control unit 25 which received the vehicle speed pulse signal from the vehicle speed pulse port 25*i* obtains the duty ratio from the vehicle speed pulse, and observes the value as the duty ratio in the normal state. As shown in the graph in the normal state in FIG. 11(*b*), in the normal state, it is calculated assuming that the duty ratio is 50%.

The driver 103 detects the failure by detecting the failure of the respective sensors in the driver 103 or excessive current flowing in the dynamo-electric motor 100 by the self detecting function. When abnormality is detected, the driver 103 lowers the vehicle speed pulse signal to a predetermined value or below (for example, 25% shown as the value in the abnormal state in FIG. 11(*b*)), and transmits the vehicle speed pulse signal to the battery control unit 25. The battery control unit 25 detects the failed state quickly from the change of the duty ratio of the vehicle speed pulse, and displays it on the alarm display unit 400*f* of the speed meter 400, thereby notifying the same to the operator immediately.

The technology according to the present embodiment can be used for an engine vehicle to provide a less-expensive meter or maintenance system by the combination with the ECU (Electronic Control Unit), which can store the total travel distance and the trip travel distance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric vehicle comprising:
   a dynamo-electric motor for applying motive power to a drive wheel;
   a battery for supplying electric power to the dynamo-electric motor;
   a driver for performing drive control of the dynamo-electric motor;
   a single control unit for performing control relating to charging and discharging of the battery; and
   a display unit for displaying predetermined information relating to the vehicle,
   wherein the single control unit includes a speed pulse detector and a communication port, the communication port being directly connected to both the speed pulse detector and to the display unit,
   wherein the speed pulse detector obtains a vehicle speed, a total travel distance, and a trip travel distance based on a vehicle speed pulse of the dynamo-electric motor detected by the driver, and the communication port transmits information relating to the vehicle speed, the total travel distance, and the trip travel distance, and information relating to charging and discharging of the battery to the display unit.

2. The electric vehicle according to claim 1, wherein the control unit calculates a residual travel distance of the battery based on the vehicle speed pulse detected by the driver.

3. The electric vehicle according to claim 1, wherein when the driver detects an abnormality, the driver changes a duty ratio of the vehicle speed pulse to a predetermined value and transmits the same to the control unit, and the control unit transmits the abnormality to the display unit via the communication port, the display unit including an alarm display unit for displaying the abnormality,
   wherein the abnormality is an amount of current flowing through the motor in excess of a predetermined value.

4. The electric vehicle according to claim 1, wherein when the driver detects an abnormality, the driver changes a duty ratio of the vehicle speed pulse to a predetermined value and transmits the same to the control unit, and the control unit transmits the abnormality to the display unit via the communication port, the display unit including an alarm display unit for displaying the abnormality.
   wherein the abnormality is a temperature of the motor in excess of a predetermined value.

5. The electric vehicle according to claim 1, wherein the display unit is capable of displaying a history of usage of the battery so that an operator can confirm information relating to the history of the usage of the battery.

6. The electric vehicle according to claim 1, wherein said control unit includes a memory for storing total travel distance and trip travel distance.

7. The electric vehicle according to claim 1, wherein the control unit includes a charger for rectifying and lowering a commercial power source to a prescribed voltage and allowing the current to flow into the battery and a DC-DC converter for converting a battery voltage from a high voltage for driving the dynamo-electric motor to a low voltage for supplying electricity to electric components on the vehicle.

8. The electric vehicle according to claim 1, and further including a reduction power transmitting system for transmitting output power from the dynamo-electric motor to the drive wheel.

9. The electric vehicle according to claim 1, and further including a regenerative charging mechanism operatively connected to said dynamo-electric motor for converting the rotational force transmitted from the drive wheel to the dynamo-electric motor when the speed is reduced into electric energy that is accumulated in the battery.

10. The electric vehicle according to claim 1, wherein the display unit includes a residual quantity of battery display for notifying an operator of the residual quantity of the battery by reducing a number of illuminated blocks as the residual quantity of the battery decreases.

11. The electric vehicle according to claim 1, wherein the control unit is mounted above the driver and the motor.

12. The electric vehicle according to claim 1, wherein the display unit is viewable by a rider while operating the vehicle, and the control unit is mounted under a seat of the vehicle on which the rider sits while operating the vehicle.

13. The electric vehicle according to claim 1, wherein the driver and the motor are housed in a case that is swingably attached to a rear part of a frame of the vehicle.

14. The electric vehicle according to claim 1, wherein the control unit is mounted on the vehicle separately from each of the driver, the motor, the battery, and the display unit.

15. An electric vehicle comprising:
a dynamo-electric motor for supplying rotation to a drive wheel;
a battery for supplying electric power to the dynamo-electric motor;
a driver for controlling the dynamo-electric motor;
a single control unit having a speed pulse detector and communication means; and
a display unit for displaying predetermined information,
wherein the communication means of the single control unit is directly connected to both the speed pulse detector and to the display unit,
wherein the speed pulse detector obtains a vehicle speed, a total travel distance, and a trip travel distance based on a vehicle speed pulse of the dynamo-electric motor detected by the driver and for controlling a charging and discharging of the battery, and
the communication means communicates information relating to the vehicle speed, the total travel distance and the trip travel distance and information relating to the charging and discharging of the battery to the display unit for displaying the information relating to the vehicle speed, the total travel distance, and the trip travel distance, and information relating to charging and discharging of the battery on the display unit.

16. The electric vehicle according to claim 15, wherein the control unit calculates a residual travel distance of the battery based on the vehicle speed pulse detected by the driver.

17. The electric vehicle according to claim 16, wherein when the driver detects an abnormality, the driver changes a duty ratio of the vehicle speed pulse to a predetermined value and transmits the same to the control unit, and the control unit transmits the abnormality to the display unit via the communication port, the display unit including an alarm display unit for displaying the abnormality,
wherein the abnormality is a temperature of the motor in excess of a predetermined value.

18. The electric vehicle according to claim 15, wherein when the driver detects an abnormality, the driver changes a duty ratio of the vehicle speed pulse to a predetermined value and transmits the same to the control unit, and the control unit transmits the abnormality to the display unit via the communication port, the display unit including an alarm display unit for displaying the abnormality.
wherein the abnormality is an amount of current flowing through the motor in excess of a predetermined value.

19. The electric vehicle according to claim 15, wherein the display unit is capable of displaying a history of usage of the battery so that an operator can confirm information relating to the history of the usage of the battery.

20. The electric vehicle according to claim 15, wherein said control unit includes a memory for storing total travel distance and trip travel distance.

21. The electric vehicle according to claim 15, wherein the control unit includes a charger for rectifying and lowering a commercial power source to a prescribed voltage and allowing the current to flow into the battery and a DC-DC converter for converting a battery voltage from a high voltage for driving the dynamo-electric motor to a low voltage for supplying electricity to electric components on the vehicle.

22. The electric vehicle according to claim 15, and further including a reduction power transmitting system for transmitting output power from the dynamo-electric motor to the drive wheel.

23. The electric vehicle according to claim 15, and further including a regenerative charging mechanism operatively connected to said dynamo-electric motor for converting the rotational force transmitted from the drive wheel to the dynamo-electric motor when the speed is reduced into electric energy that is accumulated in the battery.

24. The electric vehicle according to claim 15, wherein the display unit includes a residual quantity of battery display for notifying an operator of the residual quantity of the battery by reducing a number of illuminated blocks as the residual quantity of the battery decreases.

* * * * *